Jan. 21, 1969     A. L. WITTWER     3,422,700
DRIVE SYSTEM FOR BUSINESS MACHINES
Filed July 10, 1967
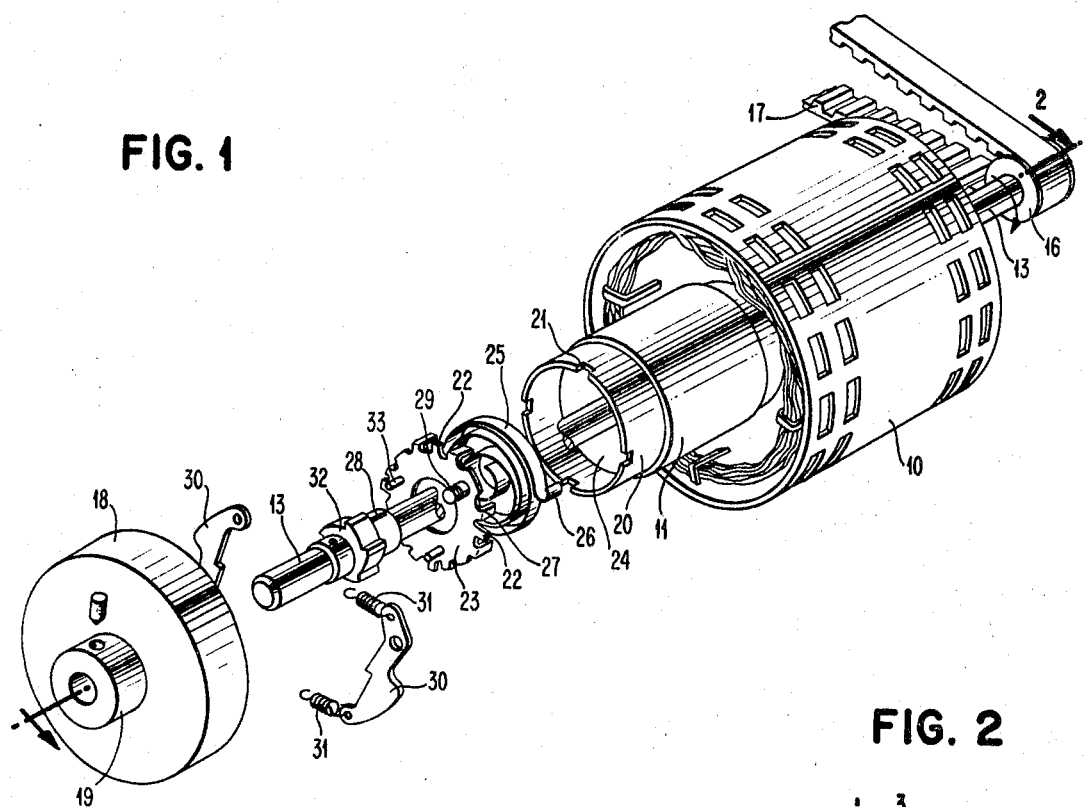
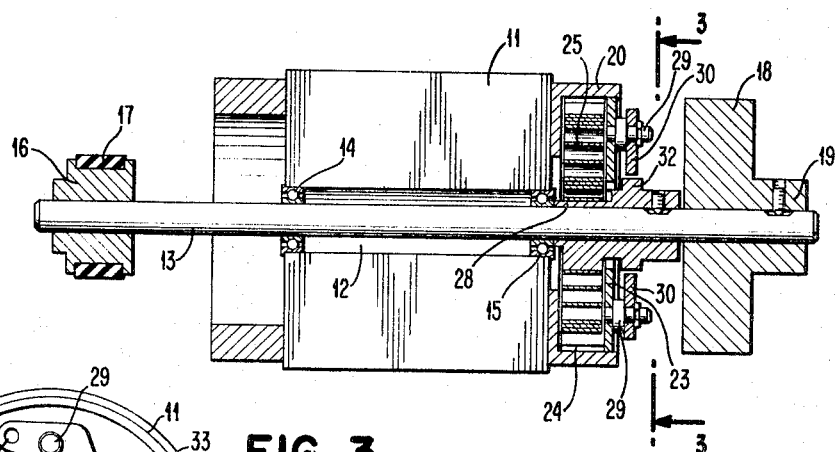
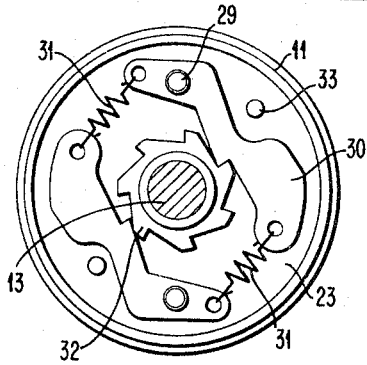
INVENTOR
ALVIN L. WITTWER
BY    *John A. Brady*
ATTORNEY.

United States Patent Office 3,422,700
Patented Jan. 21, 1969

3,422,700
DRIVE SYSTEM FOR BUSINESS MACHINES
Alvin L. Wittwer, Paris, Ky., assignor to International Business Machines Corporation, Armonk, N.Y., a corporation of New York
Filed July 10, 1967, Ser. No. 652,281
U.S. Cl. 74—574          10 Claims
Int. Cl. F16h *5/44;* F16d *3/14*

ABSTRACT OF THE DISCLOSURE

A drive system for electric typewriters and similar cyclically operated business machines is disclosed. The drive system comprises an electrical motor having a rotor which is journaled on a drive shaft. The rotor is coupled to the drive shaft by a relatively stiff spring during normal driving operations. A flywheel is rigidly mounted on the drive shaft and the shaft is drivingly coupled to the load. A centrifugal clutch is provided for directly connecting the rotor with the drive shaft and effectively bypassing the spring during starting and stopping operations. The overall arrangement is such that the relatively instantaneous fluctuations and variations in the driven load are damped by the combined action of the flywheel and spring. The variations in the electrical power requirements for the motor are minimized and occur over an extended period of time.

---

The present invention relates generally to the motor arts. It is more particularly concerned with the provision of a drive system for powering cyclically operable business machines, such as electric typewriters.

In many drive systems it is desirable to at least partially isolate either the driving or driven member from the effects of rapid fluctuations or variations in the operation of the other member. For example, variations in the power requirements for a motor driving an electric typewriter occur due to rapid changes in the driven load when typing operations are performed.

It has previously been suggested to employ a flywheel and spring connected in series between driving and driven members to minimize or dampen the effects of rapid fluctuations in the operation of one of the members on the other. While a properly designed drive system incorporating a spring and flywheel will accomplish this result, a problem is encountered when an attempt is made to use such an arrangement in a drive system which is intermittently started and stopped. An electric typewriter, for example, will be turned on and off many times by the typist during normal operations. Since the starting torque of the drive motor employed is usually substantially above that supplied during normal machine running conditions, the spring is tightly wrapped or compressed when the drive system is initially energized. The repeated starting and stopping with the resulting high torque applied to the spring during starting operations either results in fatigue and failure of the spring after a relatively short period of time, or requires redesign of the drive system to incorporate a stronger spring. The latter solution is unattractive and represents a design compromise since the selected spring may be too stiff to dampen or modify the rapid fluctuations encountered during normal running operations to the extent required.

In view of the above, it is the primary or ultimate object of the present invention to provide a drive system for cyclically operated business machines and the like wherein the variations in the electrical power required by the drive motor are effectively smoothed and occur over an extended period of time when compared to the rapid fluctuations in the applied load. A spring and flywheel are connected in the drive system in such a manner as to effectively isolate the electrical source from the mechanical power requirements.

Another object of the invention is the provision of a drive system having a flywheel and a spring which incorporates means to prevent undue stressing of the spring under high torque starting conditions. This is accomplished in the illustrated embodiment of the invention by the use of a centrifugal clutch which effectively bypasses the spring until the drive system reaches a predetermined speed. Thus, during starting operations, there is a direct drive connection between the driving and driven members and damage to the spring is prevented.

A further object of the invention is the provision of a drive system having the characteristics described above which is highly simplified in construction and operation. The various components of the drive system are mounted in a manner to provide a very compact assembly which occupies a minimum of space.

The foregoing and other objects, features and advantages of the invention will be apparent from the following more particular description of a preferred embodiment of the invention, as illustrated in the accompanying drawings.

In the drawings:

FIGURE 1 is an exploded side perspective view of a drive system constructed in accordance with the teachings of this invention;

FIGURE 2 is a side sectional view taken along the section line 2—2 of FIGURE 1; and FIGURE 3 is an end sectional view taken along the section line 3—3 of FIGURE 2.

Referring now to the drawings, the reference numeral 10 designates generally the housing and the stator windings of a permanent split-phase induction type motor. A starting capacitor, not shown, is connected in the starting winding circuit for the motor. The capacitor provides a high starting torque and controls the direction of rotation of the motor. More information concerning this motor and the circuit for energizing the same are disclosed on pages 1 and 2 of the "IBM Customer Engineering Instruction Manual for the 'Selectric' I/O Keyboard Printer," Form No. 241-5159-2, published and copyrighted in 1965 by International Business Machines Corporation, Armonk, N.Y. The actual construction of the motor stator and the energizing circuit are not important to an understanding of the present invention and will not be further described. It should be noted, however, that the motor is adapted to produce a torque during starting operations which is substantially greater than that experienced or required during normal running conditions.

Nestingly received within the stator 10 is an annular rotor 11 having a central opening 12 therein. Extending through the central opening 12 is an elongated drive shaft 13. A pair of annular bearing assemblies 14 and 15 are mounted at the opposite ends of the rotor 11 adjacent the central opening 12. The arrangement is such that the rotor 11 is supported by and mounted or journalled for rotation relative to the drive shaft 13.

The drive shaft 13 projects on opposite sides of the motor and a toothed pulley 16 is mounted on one end thereof. A drive belt 17 interconnects the drive shaft 13 with the load, not shown. The load may be the operating mechanisms of any cyclically operated business machine but in a constructed embodiment of the invention included "Selectric" typewriter apparatus of the type described in the above-identified instruction manual. Particular attention is directed to the description of the character selection and printing mechanisms contained in this manual. These mechanisms are intermittently connected with a shaft driven by the drive belt 17. The result is that the drive shaft 13 is subjected to wide variations in the load to be driven or torque required occurring over relatively small increments of time in response to initiation of a character printing or other function operation of the typewriter. Since torque and speed outputs are related functions for a motor, the increased torque required to power the typewriter apparatus will result in a temporary reduced speed of rotation for the drive shaft 13.

Mounted at the extreme other end of the drive shaft 13 is a flywheel 18. The flywheel has considerable mass and inertia and, as will be hereinafter more fully explained, is provided to resist the effects of the rapid fluctuations in the load applied to the drive shaft 13. The flywheel 18 has a collar 19 that receives a set screw so that the flywheel is rigidly attached to and rotates with the drive shaft 13.

The rotor is provided with an annular sleeve 20 which projects outwardly from the body of the rotor itself. The outer edge of the sleeve 20 is notched at 21 for receiving tabs 22 extending from and providing a means for staking or otherwise attaching a cover plate 23 to the sleeve 20. The cover plate 23 and the end portion of the sleeve 20 projecting beyond the rotor itself define a housing 24 for a clock type coil spring 25. The spring 25 is made of strip steel of selected thickness and strength and has one end bent at 26 to engage one of the inturned lugs 27 of the cover plate 23. The opposite end of the spring 25 is attached to a spring arbor 28 which is in turn rigidly connected to and rotatable with the drive shaft 13. It should be noted that the coil spring 25 defines the drive connection at normal operating speeds between the rotor 11 of the motor and the drive shaft 13.

The cover plate 23 is provided with a pair of outwardly extending pivot pins 29 which pivotally mount a pair of pawls 30. Springs 31 interconnect the adjacent ends of the two pawls whereby they are urged toward engagement with the teeth of a ratchet 32. The ratchet 32 is formed integrally with the spring arbor 28 and rotates with the drive shaft 13. Stop pins 33 project from the face of the cover plate 23 to limit outward pivoting movement of the pawls 30. The pawls 30 and the ratchet 32 define a centrifugal clutch which is engaged when the drive system is at rest and anytime the speed of the rotor is below a predetermined value. The centrifugal clutch provides a direct drive connection between the rotor 11 and the drive shaft 13 during slow speed operations which effectively bypasses the coil spring 25.

Considering now the operation of the apparatus described above, it will be assumed that the drive system is initially at rest with the pawls 30 engaging the ratchet 32. The motor is started by supplying electrical energy to the stator 10 and a high torque is applied to the rotor 11. This driving force is transmitted directly to the drive shaft 13 through the engaged centrifugal clutch. The coil spring 25 is effectively isolated from the applied forces at this time and rotates with the directly coupled rotor and drive shaft.

Eventually the speed of the rotor and the drive shaft reaches the point where the pawls 30 are thrown outwardly against stop pins 33 due to the centrifugal forces involved and disengage from the ratchet 32. The rigid drive connection between the drive shaft 13 and the rotor 11 is broken. The coil spring 25 becomes effective to provide a resilient connection between the rotor of the motor and the drive shaft. During the normal idling condition the coil spring 25 is wound just sufficiently to transmit the constant idling torque required to the driven load.

If the load is changed rapidly, such as will occur in an electric typewriter when a cycle clutch is released to cause the actuation of character selection and printing mechanism, the drive shaft 13 will tend to slow down. This is counteracted by the action of the flywheel 18 whose inertia and mass tends to maintain the rotation of the drive shaft 13 at the same speed. However, the drive shaft 13 begins to slow down and the coil spring 25 is wound by the rotor 11. Relative rotative movement occurs between the rotor 11 and the drive shaft 13 which causes winding of the coil spring. The extent of winding of the coil spring will depend on the constant of the spring and the torque requirement imposed on the drive shaft 13 by the load. In a constructed embodiment of the invention the spring was designed to be wound about one-fifth of a turn during the idle condition and almost completely wound when the greatest load condition was encountered.

The winding of the coil spring 25 by the continued faster rotation of the rotor relative to the drive shaft 13 minimizes and spreads over a longer period of time the effect of the relatively instantaneous increases in the load applied to the drive shaft 13. The rotor continues to rotate at a faster rate against the increasing force applied by the coil spring 25. Eventually, an equilibrium point is reached where the drive shaft begins to regain its initial or idling speed. The spring 25 now begins to unwind and release the stored energy back into the system. This stored energy assists in accelerating the drive shaft 13. The overall effect of the above described operation is that the rapid variations or fluctuations in the load have been smoothed out and spread over a considerably longer interval of time when their effect is observed at the rotor of the motor.

It should be apparent that the objects initially set forth have been accomplished. Of particular importance is the provision of a centrifugal clutch connected between the rotor and the drive shaft of a motor which effectively bypasses the resilient drive spring during starting operations. This avoids fatigue and breaking of the spring while permitting the spring to be optimumly designed for its use in the drive system. The drive system is highly simplified in construction and design to provide a very compact assembly well adapted for use in a powered business machine, such as an electric typewriter.

What is claimed is:

1. A drive system for a cyclically operable business machine and the like comprising:
    a motor having an annular stator;
    an annular rotor received within said stator;
    a drive shaft extending into said annular rotor;
    means mounting said annular rotor for rotation relative to said stator and said drive shaft;
    a flywheel rotatable with said drive shaft;
    a load drivingly connected to said drive shaft;
    resilient means drivingly interconnecting said rotor and said drive shaft; and
    a clutch means connected between said rotor and said drive shaft for bypassing said resilient means during starting operations.

2. A drive system according to claim 1 further characterized by:
    said clutch means comprising a ratchet mounted on and rotatable with said shaft, a movable ratchet engaging member rotatable with said rotor and resilient means urging said movable ratchet engaging member into engagement with said ratchet.

3. A drive system according to claim 1 further characterized by:
    said resilient means comprising a clock type coil spring; and
    said clutch means comprising a ratchet mounted on and rotatable with said drive shaft, a pivoted pawl rotatable with said rotor and spring means urging said pawl into engagement with said ratchet.

4. A drive system according to claim 3 further characterized by:
    said rotor having an annular sleeve projecting from one end of said rotor to define a cup-shaped opening;
    said clock type spring being received within said cup-shaped opening;
    a cover plate attached to the open end of said annular sleeve; and said pawl of said clutch being pivoted on said cover plate.

5. A drive system for a cyclically operable business machine or the like comprising:
- a motor having an annular stator;
- an annular rotor received within said stator;
- a drive shaft extending into said annular rotor;
- means mounting said annular rotor for rotation relative to said stator and said drive shaft;
- a load drivingly connected to said drive shaft;
- resilient means drivingly interconnecting said rotor and said drive shaft; and
- a clutch means connected between said rotor and said drive shaft for bypassing said resilient means during starting operations.

6. A drive system according to claim 5 further characterized by:
- said clutch means comprising a ratchet mounted on and rotatable with said shaft, a movable ratchet engaging member rotatable with said rotor and resilient means urging said movable ratchet engaging member into engagement with said ratchet.

7. A drive system according to claim 5 further characterized by:
- said resilient means comprising a clock type coil spring; and
- said clutch means comprising a ratchet mounted on and rotatable with said drive shaft, a pivoted pawl rotatable with said rotor and spring means urging said pawl into engagement with said ratchet.

8. A drive system for a cyclically operable business machine or the like comprising:
- a motor having an annular stator;
- an annular rotor received within said stator;
- a drive shaft extending into said annular rotor;
- means mounting said annular rotor for rotation relative to said stator and said drive shaft;
- a flywheel rotatable with said drive shaft;
- a load drivingly connected to said drive shaft; and
- a clock type spring encircling said drive shaft and drivingly interconnecting said rotor and said drive shaft.

9. A drive system according to claim 8 further characterized by:
- said rotor having an annular sleeve projecting from one end of said rotor to define a cup-shaped opening;
- said clock type spring being received within said cup-shaped opening; and
- a cover plate attached to the open end of said annular sleeve.

10. A drive system for a cyclically operable business machine and the like comprising:
- an electric motor having an annular stator;
- an annular rotor received and rotatable within said stator;
- a drive shaft extending into said annular rotor;
- axially spaced annular bearing means carried by and said annular rotor for rotation relative to said drive shaft;
- a flywheel attached to and rotatable with said drive shaft;
- a load drivingly connected to said drive shaft;
- an annular sleeve projecting from one end of said rotor to define a cup-shaped opening;
- a clock type spring encircling said drive shaft and being received in said cup-shaped opening;
- said clock type spring drivingly interconnecting said rotor and said drive shaft;
- a cover plate for the open end of said annular sleeve;
- a ratchet attached to and rotatable with said drive shaft adjacent said cover plate;
- pawl pivotally mounted on said cover plate;
- resilient means urging said pawl into engagement with said ratchet; and
- stop means carried by said plate for limiting pivoting movement of said pawl outward from said drive shaft and said ratchet under centrifugal forces.

References Cited
UNITED STATES PATENTS

| | | | |
|---|---|---|---|
| 1,817,758 | 8/1931 | McSheen | 74—574 |
| 1,838,501 | 12/1931 | Schiff. | |
| 2,516,698 | 7/1950 | Hall | 74—574 X |
| 2,851,892 | 9/1958 | Parkinson et al. | 74—574 X |

MILTON KAUFMAN, *Primary Examiner.*

U.S. Cl. X.R.

64—27; 310—75